United States Patent
Vetters

(10) Patent No.: US 6,192,085 B1
(45) Date of Patent: Feb. 20, 2001

(54) CIRCUIT ARRANGEMENT WITH A DATA SEQUENCE GENERATOR

(75) Inventor: Bernd Vetters, Nordhausen (DE)

(73) Assignee: Temic Telefunken microelectronic GmbH, Heilbronn (DE)

( * ) Notice: Under 35 U.S.C. 154(b), the term of this patent shall be extended for 0 days.

(21) Appl. No.: 09/106,087

(22) Filed: Jun. 29, 1998

(30) Foreign Application Priority Data

Jun. 27, 1997 (DE) ............................................. 197 27 303

(51) Int. Cl.$^7$ ..................................................... H03K 7/06

(52) U.S. Cl. ........................... 375/271; 375/302; 375/322; 708/190; 708/251

(58) Field of Search ................................. 375/271, 302, 375/322; 708/190, 251

(56) References Cited

U.S. PATENT DOCUMENTS

| | | | |
|---|---|---|---|
| 3,754,101 | * 8/1973 | Daspit et al. | 179/15 FS |
| 5,260,968 | * 11/1993 | Gardner et al. | 375/1 |
| 5,828,705 | * 10/1998 | Kroeger et al. | 375/326 |

FOREIGN PATENT DOCUMENTS 29 27 713   4/1980 (DE) .

OTHER PUBLICATIONS

Schüssler, Hans Wilhelm, *Digitale Signalverarbeitung* [Digital Signal processing], vol. 1, Pub. Springer–Verlag, Berlin, 1988, pp. 15 & 16.

* cited by examiner

*Primary Examiner*—Stephen Chin
*Assistant Examiner*—Dac V. Ha
(74) *Attorney, Agent, or Firm*—Venable; Norman N. Kunitz

(57) ABSTRACT

A circuit arrangement with a data sequence generator for the generation of an oscillator signal as a sequence of digital data, and having the following circuit parts: a first multiplication unit driven by a first auxiliary signal and a first control signal, where the first control signal corresponds to the sine of a manipulated variable that determines the frequency of the oscillator signal; a second multiplication unit driven by a second auxiliary signal, where the second control signal corresponds to the cosine of the manipulated variable; a third multiplication unit driven by a third auxiliary signal and a third control signal, where the third control signal corresponds to the sum of the first and second control signal; a first adding unit driven by the first multiplication unit and third multiplication unit; a second adding unit driven by the first multiplication unit and the second multiplication unit; a first time-delay unit driven by the first adding unit, where the oscillator signal is provided as a third auxiliary signal at the output of the first time-delay unit; a second time-delay unit driven by the second adding unit, where the second auxiliary signal is provided at the output of the second time-delay unit; a weighting unit for weighting the third auxiliary signal with a factor of 2, and, a third adding unit driven by the second time-delay unit and the weighting unit, where the first auxiliary signal is provided at the output of the third adding unit.

5 Claims, 2 Drawing Sheets

CIRCUIT ARRANGEMENT WITH A DATA SEQUENCE GENERATOR

BACKGROUND OF THE INVENTION

The invention relates to a circuit arrangement with a data sequence generator for generating an oscillation signal and a sequence of digital data.

In digital technology, it is frequently necessary to generate oscillator signals as sequences of digital data with sinusoidal curves. From the reference literature Schüßler: "Digitale Signalverarbeitung" ("Digital signal Processing"), Springer-Verlag, 1988, pp. 15–16, for example, it is known that the data in such a data sequence can be generated by sampling a corresponding continuous signal, by reading a table or by evaluating an appropriate approximation formula. The main disadvantage of this method is that the data sequences either have a low level of accuracy or that the amount of time or circuitry required to generate the data sequences is high.

SUMMARY OF THE INVENTION

The object of the invention is to specify a circuit arrangement of the above described type that has a small number of components and which can be used to generate high-frequency oscillator signals.

This object is solved in accordance with the present invention by a circuit arrangement that contains a data sequence generator with three multiplication units, three adding units, two time-delay units and a weighting unit. The data sequence generator generates three auxiliary signals whose values are changed iteratively as established by a manipulated variable that determines the frequency of the oscillator signal.

For this purpose, the first multiplication unit is driven by the first auxiliary signal and a first control signal, the second multiplication unit by the second auxiliary signal and a second control signal, and the third multiplication unit by the third auxiliary signal and a third control signal, where the first control signal corresponds to the sine of the manipulated variable, the second control signal corresponds to the cosine of the manipulated variable, and the third control signal corresponds to the total of the first and second control signals. Furthermore, the first adding unit is driven by the first and third multiplication units, the second adding unit is driven by the first and second multiplication units, the first time-delay unit is driven by the first adding unit, the second time-delay unit is driven by the second adding unit, and the third adding unit is driven via the weighting unit by the first time-delay unit and by the second time-delay unit. The third auxiliary signal is provided at the output of the first time-delay unit, the second auxiliary signal at the output of the second time-delay unit and the first auxiliary signal at the output of the third adding unit, the third auxiliary signal representing the oscillator signal generated by the data sequence generator.

For generating the three control signals, the circuit arrangement preferably has a control unit that is driven by a digital data value corresponding to the manipulated variable.

In an advantageous development, the data sequence generator is used to generate modulator signals for the I/Q demodulation of a complex input signal. The auxiliary signals generated by it as modulator signals are supplied to an I/Q demodulator which has a fourth multiplication unit driven by the imaginary part of the input signal and the first auxiliary signal, a fifth multiplication unit driven by the real part of the input signal and the second auxiliary signal, a sixth multiplication unit driven by the sum of the real part and the imaginary part and by the third auxiliary signal, a fourth adding unit driven by the fourth and sixth multiplication units, and also a fifth adding unit driven by the fifth and sixth multiplication units. Following demodulation, one then receives a complex output signal the real part of which is available at the output of the fifth adding unit and the imaginary part of which is available at the output of the fourth adding unit.

The input signal is generated preferably in a preprocessing unit by decoding serial input data bits. The decoding can be adapted to various modulation methods, in particular to the methods known under the designations CPM, OQPSK, MSK and GMSK, where CPM stands for continuous phase modulation, OQPSK for offset quadrature phase shift modulation, MSK for minimum shift keying and GMSK for Gaussian minimum shift keying. Methods of this kind are used, for example, in cordless telephones or in radiotelephones.

Because of the small number of components and the consequently small amount of space required, the circuit arrangement is ideally suitable for integration on a semi-conductor chip. It can therefore be produced at low cost and furthermore, because there are few components, it consumes little power.

DESCRIPTION OF THE PREFERRED EMBODIMENTS

The invention will now be described in more detail by means of examples of embodiment with reference to the following Figures.

Figure 1:
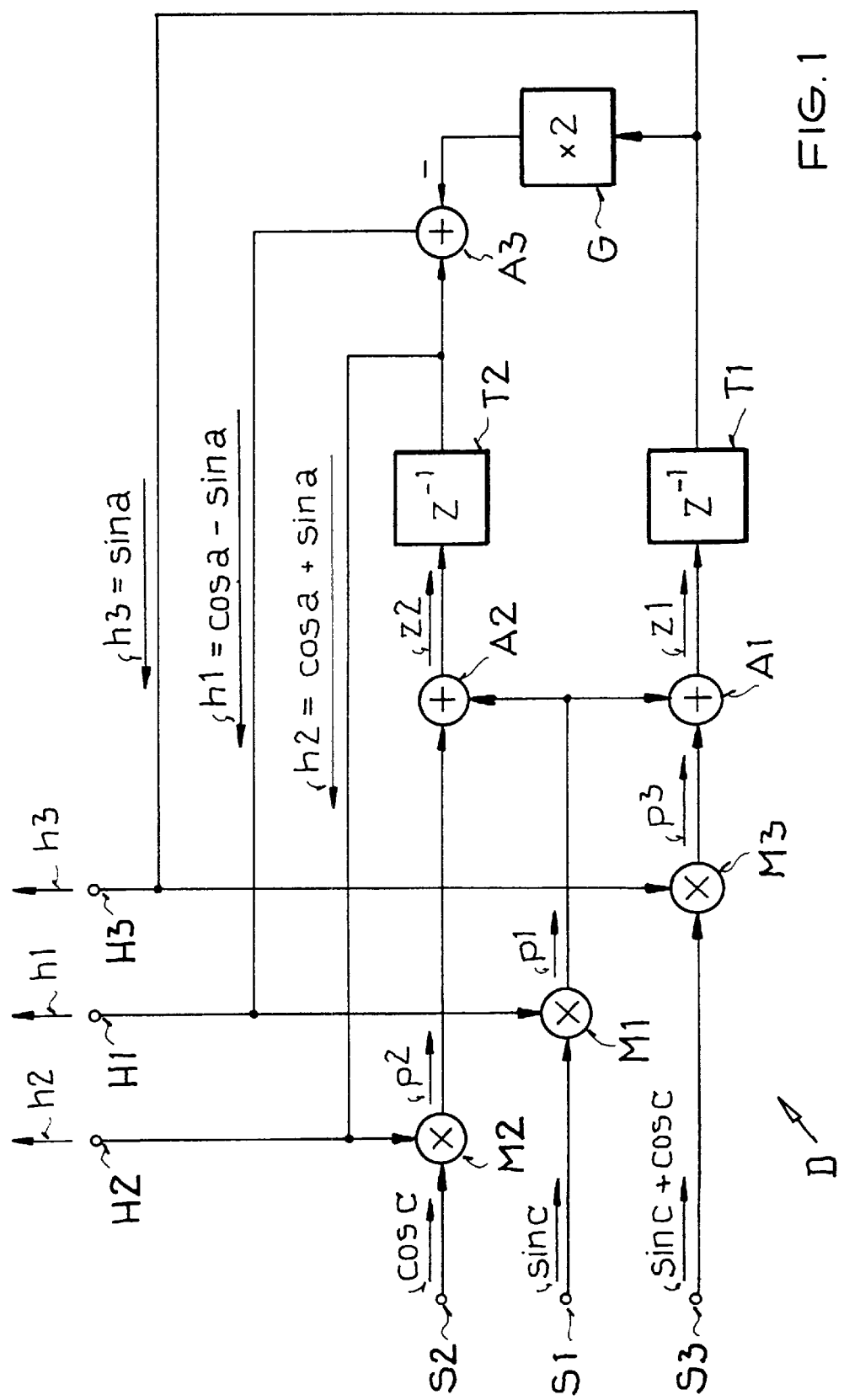
FIG. 1 an outline circuit diagram of a digital sequence generator for generating sinusoidal data sequences.

According to FIG. 1, the data sequence generator D has three control inputs S1, S2, S3, three feedback terminals H1, H2, H3, three multiplication units M1, M2, M3, three adding units A1, A2, A3, two time-delay units T1, T2 and a weighting unit G. The first multiplication unit M1 is connected with one of its inputs to the first control input S1 and with its other input to the first feedback terminal H1, the second multiplication unit M2 is connected with one of its inputs to the second control input S2 and with its other input to the second feedback terminal H2, the third multiplication unit M3 is connected with one of its inputs to the third control input S3 and with its other input to the third feedback terminal H3, the first adding unit A1 is connected with one of its inputs to the output of the first multiplication unit M1, with its other input to the output of the third multiplication unit M3 and with its output via the first time-delay unit T1 to the third feedback terminal H3, the second adding unit A2 is connected with one of its inputs to the output of the first multiplication unit M1, with its other input to the output of the second multiplication unit M2 and with its output via the second time-delay unit T2 to the second feedback terminal H2, and the third adding unit A3 is connected with one of its inputs to the second feedback terminal H2, with its other input via the weighting unit G to the third feedback terminal H3, and with its output to the first feedback terminal H1.

The control inputs S1, S2, S3 are driven as determined by a digital manipulated variable c. A first digital control signal sin c corresponding to the sine of the manipulated variable c is provided at the first control input S1, a second digital control signal cos c corresponding to the cosine of the manipulated variable c is provided at the second control input S2, and a third digital control signal sin c+cos c corresponding to the sum of the first and second control signals is provided at the third control input S3. The data sequence generator D supplies a first auxiliary signal h1 to the first feedback terminal H1, a second auxiliary signal h2 to the second feedback terminal H2, and a third auxiliary signal h3 to the third feedback terminal H3. The auxiliary signals h1, h2, h3 are supplied as sequences of digital data whose values are in accordance with the equations:

$$h1 = \cos a - \sin a,$$

$$h2 = \cos a + \sin a,$$

$$h3 = \sin a$$

where a is the angle argument. The third auxiliary signal h3 represents the desired oscillator signal sin a and the first and second auxiliary signals h1, h2 each represent another oscillator signal phase-shifted with respect to h3.

When starting up, the first time-delay unit T1 is initialized with the first data value of the third auxiliary signal h3 and the second time-delay unit T2 with the first data value of the second auxiliary signal h2.

To generate the first auxiliary signal h1, the third auxiliary signal h3 is first of all weighted in the weighting unit G with a factor of 2, i.e. it is doubled in value. Towards this end, the data bits of the data representing the third auxiliary signal h3 are shifted by one bit place towards higher level bit places by appropriately wiring the first time-delay unit T1 and the third adding unit A3. The third adding unit A3 then forms by signed addition the first auxiliary signal h1 corresponding to the equation h1=h2−2*h3.

The auxiliary signal h1, h2, h3 are multiplied in the multiplication units M1, M2 and M3 respectively by the corresponding control signals to form the product signals p1=h1*sin c and p2=h2*cos c and p3=h3*(sin c+cos c). Then the first adding unit A1 generates the first intermediate signal z1=p1+p3 and the second adding unit A2 generates second intermediate signal z2=p1+p2. Therefore, the following applies for the values of these intermediate signals:

$$z1 = (\cos a - \sin a)*\sin c + \sin a*(\sin c + \cos c) = \sin a',$$

and $$z2 = (\cos a - \sin a)*\sin c + (\cos a + \sin a)*\cos c = \cos a' + \sin a'$$

where a'=a+c, i.e. the values of the intermediate signals z1 and z2 represent the new values of the third and second auxiliary signals h3 and h2 respectively which are output from the third and second feedback terminals H3 and H2 respectively after a defined delay time given by the time-delay units T1, T2.

Figure 2:
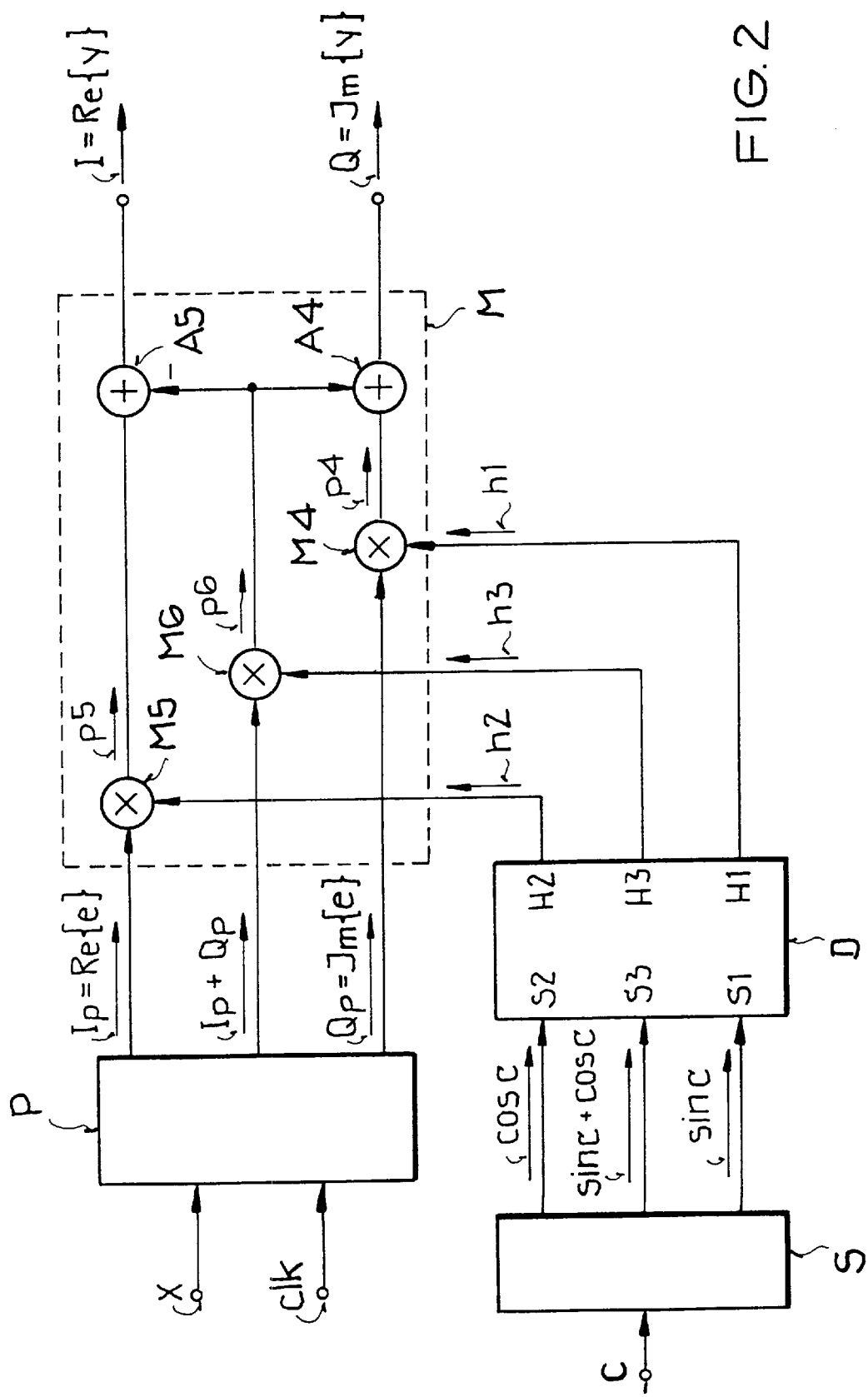
FIG. 2 a circuit arrangement for I/Q demodulation of a GMSK signal with a data sequence generator in accordance with FIG. 1.

According to FIG. 2, the auxiliary signals h1, h2, h3 generated by the data sequence generator D shown in FIG. 1 are supplied to an I/Q demodulator M in which a complex input signal e=Ip+j*Qp is converted by I/Q demodulation to a complex output signal y=I+j*Q. Ip and I represent the real part and Op and Q represent the imaginary part of the respective signals and j the imaginary unit.

The input signal e is generated in a preprocessing unit P. This is clock-pulsed by a clock signal clk and converts a sequence of serial input data bits x supplied in the form of a GMSK signal into parallel data which, after decoding as real part Ip and imaginary part Qp and as sum of real part ip and imaginary part Qp of the input signal e, are delivered to the respective outputs of the preprocessing unit P.

The I/Q demodulator M has three multiplication units and two adding units, namely the fourth, fifth and sixth multiplication units M4, M5, M6 as well as the fourth and fifth adding units A4, A5. Here, the first auxiliary signal h1 and the imaginary part Qp of the input signal e are supplied to the fourth multiplication unit M4, the second auxiliary signal h2 and the real part Ip of the input signal e are supplied to the fifth multiplication unit M5, and the third auxiliary signal h3 and the sum of the real part Ip and the imaginary part Qp of the input signal e are supplied to the sixth multiplication unit M6. The multiplication units M4, M5, M6 each multiply together the signals supplied to them so that the fourth product signal p4=h1*Qp is available at the output of the fourth multiplication unit M4, the fifth product signal p5=h2*Ip is available at the output of the fifth multiplication unit M5, and the sixth product signal p6=h3*(Ip+Qp) is available at the output of the sixth multiplication unit M6. The fourth product signal p4 and the sixth product signal p6 are then summed in the fourth adding unit A4 to form the imaginary part Q=p4+p6, i.e., the quadrature component of the output signal y. The sixth adding unit A6 performs a signed addition and generates from the fifth and sixth product signals p5, p6 the real part I=p5−p6, i.e. the cophasal component of the output signal y. The components I and Q of the output signal y thus comply with the equations:

$$I = Ip*\sin a - Qp*\cos a,$$

$$Q = Ip*\cos a + Qp*\sin a,$$

i.e., the output signal a represents the product of the input signal e and a complex carrier in the form sin a+j*cos a.

For the I/Q demodulation, the oscillator signal sin a must be phase-locked to the carrier frequency of the input signal e. If the phase or frequency needs to be corrected, this is done by varying the manipulated variable c whose value can be calculated, for example, by evaluating the input signal e. The manipulated variable c is supplied to the control unit S, for instance a sine/cosine converter or a microcontroller, which generates from it the control signals cos c, sin c, sin c+cos c required by the data sequence generator D. The manipulated variable c and the control signals cos c, sin c, sin c+cos c vary only slowly by comparison with the auxiliary signals h1, h2, h3 and by comparison with the input signal e. Consequently, a lower signal processing speed is required for the control unit S than for the data sequence generator D or the I/Q demodulator. The control unit S can therefore be optimized to a minimum required chip area, at the expense of the signal processing time.

What is claimed is:
1. Circuit arrangement with a data sequence generator (D) for generating an oscillator signal (sin a) as a sequence of digital data, wherein there is
   a first multiplication unit (M1) driven by a first auxiliary signal (h1) and a first control signal (sin c), where the first control signal (sin c) corresponds to the sine of a manipulated variable (c) that determines the frequency of the oscillator signal (sin a),
   a second multiplication unit (M2) driven by a second auxiliary signal (h2) and a second control signal (cos c), where the second control signal (cos c) corresponds to the cosine of the manipulated variable (c),
   a third multiplication unit (M3) driven by a third auxiliary signal (h3) and a third control signal (sin c+cos c), where the third control signal (sin c+cos c) corresponds to the sum of the first and second control signals (sin c, cos c), a first adding unit (A1) driven by the first multiplication unit (M1) and third multiplication unit (M3), a second adding unit (A2) driven by the first multiplication unit (M1) and the second multiplication unit (M2), a first time-delay unit (T1) driven by the first adding unit (A1), where the oscillator signal (sin a) is provided as third auxiliary signal (h3) at the output of the first time-delay unit (T1), a second time-delay unit (T2) driven by the second adding unit (A2), where the second auxiliary signal (h2) is provided at the output of the second time-delay unit (T2), a weighting unit (G) for weighting the third auxiliary signal (h3) with a factor of 2, a third adding unit (A3) driven by the second time-delay unit (T2) and the weighting unit (C), where the first auxiliary signal (h1) is provided at the output of the third adding unit (A3).

2. Circuit arrangement in accordance with claim 1, wherein there is a control unit (S) driven by a digital value corresponding to the manipulated variable (c) for the purpose of generating the control signals (sin c, cos c, sin c+cos c).

3. Circuit arrangement in accordance with claim 1, wherein there is an I/Q demodulator (M) for the I/Q demodulation of a complex input signal (e) which has a fourth multiplication unit (m4) driven by the first auxiliary signal (h1) and the imaginary part (Qp) of the input signal (e), has a fifth multiplication unit (M5) driven by the second auxiliary signal (h2) and the real part (Ip) of the input signal (e), has a sixth multiplication unit (M6) driven by the third auxiliary signal (h3) and the sum of the real part (Ip) and the imaginary part (Qp) of the input signal (e), has a fourth adding unit (A4) driven by the fourth multiplication unit (M4) and the sixth multiplication unit (M6), where the imaginary part (Q) of an out put signal (y) is provided at the output of the fourth adding unit (A4), and has a fifth adding unit (A5) driven by the fifth multiplication unit (M5) and the sixth multiplication unit (M6), where the real part (I) of the output signal (y) is provided at the output of the fifth adding unit (A5).

4. Circuit arrangement in accordance with claim 3, wherein there is a preprocessing unit (P) for generating the input signal (e) from serial input data bits (x).

5. Use of the circuit arrangement in accordance with claim 4 for the I/Q demodulation of continuous-phase-modulation (CPM), offset-quadrature-Phase-shift-keying (OQPSK), minimum-shift-keying (MSK) or Gaussian-minimum-shift-keying (GMSK) signals.

* * * * *